United States Patent [19]

Graves

[11] 4,264,372
[45] Apr. 28, 1981

[54] CALCIUM CARBONATE CONTAINING KAOLIN CLAY ADDITIVE

[75] Inventor: Matthew D. Graves, Dawsonville, Ga.

[73] Assignee: The Georgia Marble Company, Atlanta, Ga.

[21] Appl. No.: 88,240

[22] Filed: Oct. 25, 1979

[51] Int. Cl.³ .............................................. C09C 1/02
[52] U.S. Cl. ..................................... 106/306; 260/815
[58] Field of Search ........................ 106/306; 260/815; 71/62, 63; 423/267, 275, 430

[56] References Cited

U.S. PATENT DOCUMENTS

| | | | |
|---|---|---|---|
| 935,695 | 10/1909 | Schultze | 84/476 |
| 1,457,503 | 6/1923 | Cross | 210/667 |
| 1,521,306 | 12/1924 | McDermet | 210/664 |
| 1,646,596 | 10/1927 | Reinbold | 424/149 |
| 2,700,621 | 1/1955 | Schwalbe et al. | 106/214 |
| 3,373,134 | 3/1968 | Yasui et al. | 260/41.5 |
| 3,443,890 | 5/1969 | Sisson et al. | 423/432 |
| 3,661,610 | 5/1972 | Ferris | 106/288 B |
| 3,753,753 | 8/1973 | Kirby et al. | 106/306 |
| 3,883,364 | 5/1975 | Robertson | 106/306 |
| 3,940,350 | 2/1976 | Deltosse et al. | 106/306 |
| 3,959,192 | 5/1976 | Delfosse et al. | 106/306 |
| 3,959,204 | 5/1976 | Dunn | 106/306 |
| 3,989,195 | 11/1976 | Falcon-Steward | 106/306 |
| 4,042,412 | 8/1977 | Williams | 106/306 |

OTHER PUBLICATIONS

Product Bulletin, Evans Clay Co., East Orange, N. J.
Bentonite Handbook, Silica Products Co., Kansas City, Mo. 1930, pp. 38, 40.
Olin et al., The Use of Bentonite Clays in Water Treatment, J.A.W.W.A., vol. 30, No. 3, 1938, pp. 498–506.

*Primary Examiner*—James Poer
*Attorney, Agent, or Firm*—Charles W. Vanecek; James W. Grace

[57] ABSTRACT

A calcium carbonate composition contains a minor amount of kaolin clay, said kaolin clay being present in an amount sufficient to improve the dispersibility of the calcium carbonate, particularly in rubber matrices.

38 Claims, No Drawings

CALCIUM CARBONATE CONTAINING KAOLIN CLAY ADDITIVE

BACKGROUND OF THE INVENTION

1. Field of the Invention

This invention is directed to a calcium carbonate composition containing a minor amount of kaolin clay and to the use of the composition in organic media, particularly rubber matrices.

2. Description of the Prior Art

Calcium carbonate, particularly when in a finely divided state, has many desirable properties which make it valuable as a reinforcing pigment in various organic compositions, as, e.g., plastics, paints, rubbers, etc. A fine particle size calcium carbonate is particularly useful in rubber stocks where it reinforces the rubber and gives rise to high tensile strengths. Because calcium carbonate is pure white in color, it is possible to prepare high tensile strength light colored rubber stocks, which is not possible with many reinforcing pigments such as carbon black.

In spite of the many desirable properties of calcium carbonate, it has certain serious shortcomings which limit its acceptance by the rubber industry. The ultra fine particle size calcium carbonate forms hard agglomerates which are extremely difficult to incorporate and disperse in the rubber matrix. When such a fine particle size calcium carbonate is incorporated into rubber on a two-roll differential speed rubber mill, the calcium carbonate pigment forms a hard cake on the back roll which must be loosened by scraping, and the resulting agglomerated particles disperse poorly in the rubber. The aforementioned difficulties can be partially overcome by master batching techniques, but these require longer processing cycles and limit the acceptance of calcium carbonate in the rubber industry.

It is particularly important in industry that the calcium carbonate should disperse quite readily in water. Aqueous dispersions of calcium carbonate find utility in the form of slurries for paper products, for rubber latex formulations, as well as for other purposes. It has often been found quite difficult to disperse the calcium carbonate in water, and to achieve slurries of an appropriate concentration without unduly increasing the slurry viscosity. It is of course a material advantage to be able to produce a concentrated slurry provided the viscosity is such that the slurry can be flowed and otherwise handled with convenience. Another disadvantage encountered in prior art aqueous slurries of calcium carbonate materials is that the materials frequently settle and pack in the bottom of their containing vessels. The settled particles can pack so hard that it is almost impossible to redisperse them.

OBJECTS OF THE INVENTION

It is an object of this invention to provide a calcium carbonate composition having improved processing characteristics and one which is more easily dispersed in organic media, particularly rubbers.

A further object of this invention is to provide a calcium carbonate composition that will provide improved physical properties in the rubber compositions in which it is incorporated.

It is a still further object of this invention to provide for the preparation of aqueous slurries of well-dispersed calcium carbonate particles with a minimum of time, effort, and expense, said slurries being characterized by good flowability and ease of redispersibility.

It is yet another object of this invention to provide an improved rubber latex formulation containing as the extender and/or color pigment the calcium carbonate composition of the invention.

Other objects and advantages of this invention will become apparent from the following detailed description thereof.

SUMMARY OF THE INVENTION

This invention provides an easily dispersible calcium carbonate composition comprising a calcium carbonate material and a minor amount of a kaolin clay. The kaolin is incorporated into the calcium carbonate material in an amount effective for improving the dispersibility of the material, particularly in rubber latices. More particularly, the calcium carbonate composition of the invention comprises a calcium carbonate material and from about 0.01 to 20% by weight of kaolin, based on the weight of the calcium carbonate material. Both natural and synthetic calcium carbonate can be treated in accordance with the invention. The calcium carbonate composition of the invention can be prepared by a simple mixing together of the calcium carbonate and kaolin clay, such as by dry blending of the two. The resultant calcium carbonate/kaolin clay mixture has excellent processing characteristics and is easily incorporated into rubber stocks without the difficulties that are usually associated with fine particle size calcium carbonate materials.

DETAILED DESCRIPTION OF THE INVENTION

According to the present invention there is provided a composition comprising a calcium carbonate material and an effective amount of kaolin clay to improve the dispersibility of the calcium carbonate in organic media, particularly rubber matrices.

Any calcium carbonate material can be used in the present invention. Treatable calcium carbonate materials include calcium carbonate itself and naturally occurring mineral deposits containing substantial amounts of calcium carbonate. The calcium carbonate is advantageously in a finely divided state. The particle sizes of the calcium carbonate material being clay treated can vary widely. A suitable particle size distribution is from 0.001 to 500 microns. Suitable sources of the calcium carbonate are limestones such as chalk, marble or calcitic limestone and common limestone. While the kaolin clay additive is especially useful in calcium carbonate compositions from marble (a high calcium carbonate content limestone), it can also be used to advantage in other calcium carbonate materials, as e.g., common limestone, which is usually a dolomitic stone having less calcium carbonate and more magnesium carbonate with less whiteness. Suitable limestone deposits serving as sources of calcium carbonate for the present invention are quarries located at Marble Hill and Whitestone, Georgia and owned by The Georgia Marble Company, Atlanta, Georgia. Examples of calcium carbonates for treatment by kaolin clay in accordance with the present invention are Gama-Sperse 80, a dry product with particle sizes of 0.2 to 10 microns, and Gama-Sperse 6532, a dry product with particle sizes of 0.2 to 14 microns. Both products are available from The Georgia Marble Company, Atlanta, Georgia.

The clay additive of the invention is kaolin. This clay advantageously has an acidic pH. The pH of the kaolin is suitably 6.5 or less and is preferably within the range from about 4 to 6.5. For optimum results the kaolin employed is a fine powder (small particle sizes). In a preferred embodiment, 70% or more of the kaolin particles are smaller than 10 microns. Kaolin clay useful in the present invention is defined in *Industrial Mineral and Rocks,* Editor-in-Chief, Stanley J. Lefond, Fourth Edition 1975, American Institute of Mining, Metallurgical and Petroleum Engineers, Inc., pages 546 to 550, the teachings of which are incorporated herein by reference.

Among the kaolin clays which can be used in the present invention are:

1. Tako Clay—High grade colloidal kaolinitic Kaolin Clay, Pyrometric Cone Equivalent 34-35, 43.6% @ 0-½ micron; The Thomas Alabama Kaolin Company, Baltimore 9, Md.
2. Snobrite Clay—75% @ 1 micron; The Evans Clay Company, Cartersville, Ga.
3. Snofil Clay—Similar to Snobrite; The Evans Clay Company, Cartersville, Ga.
4. Apex Clay—Same as Snobrite except lower color; The Evans Clay Company, Cartersville, Ga.
5. Altowhite Clay—5% @ 1.8 microns, high purity; Georgia Kaolin Company, Elizabeth, New Jersey.
6. Cyprus Supreme Clay—This was obtained from the Alabama Air Sifter Division.
7. Kaolloid Clay—The Evans Clay Company, Cartersville, Ga.
8. Barden R Clay—J. M. Huber Corporation, Macon, Ga.
9. RC-32 Clay—Thiele Kaolin Company, Sandersville, Ga.
10. Par Clay—Dixie Clay Company, Bath, S.C.

Each of the above clays is supplied by the company mentioned under the listed trademark. Of the above clays, the Tako, Apex, and Snobrite clays have proven to be exceptionally good additives. The Apex and RC-32 clays have been found advantageous based on cost and availability.

The present invention provides for the addition of the kaolin to the calcium carbonate in an amount sufficient to improve the calcium carbonate's dispersibility in rubber matrices. A suitable amount of kaolin additive is from about 0.01% to 20% more preferably 0.1 to 5% by weight, based on the weight of the calcium carbonate material. A very satisfactory calcium carbonate composition contains about 1 to 3% (e.g., 2%) by weight of kaolin. After the clay and calcium carbonate are brought together, the two materials are dry mixed by any convenient means. The mixing can be carried out at ambient temperature by any conventional dry mixing device, as, e.g., by the tumbling action of a screw conveyor. The calcium carbonate can be pre-ground or crushed or can be ground or crushed in the presence of the kaolin. The mixing process of the invention can be readily carried out in a plant operation by metering the kaolin into or onto a conveyor (belt, screw, or pneumatic) which contains the crushed or ground limestone material. Also, the kaolin addition can be made directly into the crushing or grinding equipment. After the addition, the kaolin and limestone materials are mechanically blended and are thereafter subjected to a conventional particle classification step, as by screening, air or water classification.

The clay treated calcium carbonate compositions of the invention can be used in a wide variety of organic substrates. The compositions are particularly suitable as fillers or pigments in natural and synthetic polymers, such as plastics, e.g., PVC compounds, and rubber compounds. They have proved especially advantageous as extenders and/or color pigments in latex formulations in rug backing or other applications. By increasing the latex viscosity, they can bring about a reduction in the amount of thickener required, thus effecting a significant cost savings. A rug backing latex formulation is typically made up of the latex, an aqueous suspension of very small rubber particles, in combination with a variety of other conventional ingredients such as surfactant(s) or soap(s), water, thickener(s), extender(s) and/or color pigment(s), cure catalyst(s) or accelerator(s), pH adjuster(s), e.g., an alkali like sodium hydroxide, and others for special purposes. The latex can typically contain from about 40 to 70% by weight of submicron synthetic rubber particles. The clay treated calcium carbonate composition of the invention is employed as the extender and/or color pigment for the latex formulation. The composition of the invention can be used over a wide concentration range in the latex. For example, concentrations up to 250 parts per 100 parts of rubber, on a dry basis, can be used. The treated calcium carbonate can typically constitute from about 20 to 80% by weight, based on the total treated calcium carbonate/rubber weight. Rubber latices having the clay treated calcium carbonate of the invention incorporated therein have performed outstandingly in rug backing formulations for the carpet industry. The calcium carbonate provides a smooth looking appearance to the finished product. The finished rubber product has good compressive strength, tensile strength and modulus, and flexural strength and modulus.

The present invention further provides an aqueous suspension of dispersed calcium carbonate which contains a minor amount of kaolin clay, said kaolin clay being present in an amount sufficient to retard or prevent the settling out of the calcium carbonate from the suspension into a hard, difficultly redispersible mass. More particularly, the invention provides an aqueous suspension of calcium carbonate wherein the concentration of calcium carbonate is between about 20 and 80% by weight of the suspension and which contains as an agent which retards or prevents hard settling of the calcium carbonate from about 0.01 to 20%, more preferably 0.1 to 5%, by weight of the calcium carbonate of kaolin clay. These aqueous suspensions of the invention are characterized by improved viscosity, good flowability and other excellent handling properties. The kaolin acts as a lubricant for the calcium carbonate slurry during its flow through the processing equipment. Furthermore, through the use of these aqueous suspensions balling up or dry chunks in mixing tanks can be avoided.

The following examples are merely illustrative of the present invention without being deemed limitative in any manner thereof.

EXAMPLE 1

A number of calcium carbonate compositions of the invention were prepared from a ground marble obtained at the Whitestone Division of The Georgia Marble Company, Whitestone, Georgia. In the preparation of each calcium carbonate composition, a sample of this ground marble was combined with a minor amount of a particular kaolin clay. Samples were prepared representing five different concentrations (from 1 to 5%) of each kaolin clay in the calcium carbonate compositions. Mixing was effected by shaking the two materials together in a plastic bag. The clay and calcium carbonate mixed easily with no undispersed clay visible. The settling rate of each calcium carbonate/kaolin clay composition was tested in accordance with the procedure of Example 2.

EXAMPLE 2

A 25 gram sample of each calcium carbonate composition of Example 1 was introduced into a 250 ml graduated cylinder. Comparative calcium carbonate compositions containing two soil additives were similarly introduced into a 250 ml cylinder. The cylinder was filled to the 250 ml mark with water and shaken vigorously to mix the calcium carbonate composition with the water. The cylinder was then placed on a level surface with the ml gradations turned away from the observer. This permits the observer to readily determine the settling rates of the particles in the cylinder by reading the lowest ml gradation visible at any desired time interval.

After 30 minutes of settling time, the "turbidity" of the sample was determined. The sample's turbidity relates to its cloudiness caused by unsettled particles in the water. Therefore, the faster the settling rate the lower the sample's turbidity. The degree of turbidity or cloudiness of each sample was judged by determining the cylinder's lowest ml gradation which is still readable and the clarity of the water above it. The less cloudiness in the water, the better the settling rate and the lower the turbidity. Although all gradations to 30 ml may be visible, there are often varying degrees of cloudiness still present in the water. This is taken into account in making the reading by designating it to be clear or faint depending upon the cloudiness of the water. The readings are shown in the following Table I.

TABLE I

| Additive | Lowest ml Gradation Readable After 30 Minutes Settling @ | | | | |
|---|---|---|---|---|---|
| | 1% | 2% | 3% | 4% | 5% Additive[1] |
| 1. Tako | 150f[2] | 30f | 30c[3] | 30c | 30c |
| 2. Apex | 190f | 50f | 30c | 30c | 30c |
| 3. Snobrite | 190f | 70f | 30c | 30c | 30c |
| 4. Snofil | 210f | 190f | 30c | 30c | 30c |
| 5. Altowhite | 210f | 190f | 190f | 130f | 30f |
| 6. Cyprus Supreme | 230f | 210f | 190f | 170f | 70f, @ 6%-30f |
| 7. Whitestone's Red Dirt[4] | 230f | 190f | 150f | 30f | 30f |
| 8. Whitestone's Brown Dirt[5] | 230f | 190f | 150f | 30f | 30f |

[1]The percentage of additive in the 25 gram sample tested.
[2]f = faint - means the gradation is not distinct and the water above it still contains some cloudiness.
[3]c = clear - means the gradation and the water above it are clear and distinct.
[4]Non-kaolin soil sample obtained at the Whitestone Division, The Georgia Marble Company, Whitestone, Georgia.
[5]Non-kaolin soil sample obtained at the Whitestone Division, The Georgia Marble Company, Whitestone, Georgia.

The above results of Table I show the capability of the kaolin clays of the invention to facilitate the settling of particles of ground limestone or marble from a water suspension. The kaolin clays cause the suspended solids to settle more in unison, not to separate in multiple phases with the extreme fines being the last to settle. The results reveal that the Tako, Apex and Snobrite clays give the fastest settling rates at the lowest concentrations. The Tako clay is especially effective.

The kaolin clays of the invention have the further property of enabling the once settled solids to be resuspended with minimal agitation. This was shown by evaluating the "hardness of settling" of the above-described 25 gram calcium carbonate compositions of the invention, i.e., their compacting to the bottom of the cylinder. Each filled cylinder containing water and a calcium carbonate composition was allowed to stand for about 45 to 60 minutes and then inverted. Upon inversion, compositions exhibiting a high "settling hardness" leave a considerable residue in the cylinder. For example, the untreated ground marble leaves an appreciable residue after inversion. On the other hand, the kaolin clay additives of Table I bring about a soft settling calcium carbonate. There was evidence of some hard settling only in the case of the Cyprus Supreme clay. Substantially all the cylinder contents flowed out upon inversion in the case of each other kaolin.

EXAMPLE 3

The viscosities of calcium carbonate compositions of the invention were measured by a water slurry method to establish how they perform in aqueous media. The viscosity measurements were made on a Brookfield (RVT) Viscometer. A water slurry of each calcium carbonate composition was prepared by adding the calcium carbonate composition to water contained in the vessel where the measurement was to be made. After the addition was complete, the mixture was stirred with a spatula until the resultant slurry was uniform and free of lumps (1 to 2 minutes). The viscosity measurement was made immediately upon attaining the uniform state. This avoids any viscosity error arising from settling of the solids from an unmixed slurry. The viscosities obtained are shown in the following Table II. The kaolin clay concentrations of the calcium carbonate compositions tested and color measurements made on the slurries are also presented in Table II. The color measurements were made on a Hunter Reflectometer. A column is also provided in Table II showing the concentration of each kaolin clay which gives the best settling rates. These optimum concentrations are derived from the data presented in Table I.

TABLE II

| Kaolin Clay | Visc. (cps)/ % Kaolin | Color | | Concentration For Optimum Settling |
|---|---|---|---|---|
| | | G[1] | B[2] | |
| 1. Tako | 4000 @ 2% | 88.7 | 85.6 | 2-3% |
| | 5900 @ 3% | 88.3 | 84.4 | |
| 2. Apex | 4200 @ 2% | | | 2-3% |
| | 5800 @ 3% | 90.4 | 87.4 | |
| 3. Snobrite | 5700 @ 3% | 90.3 | 87.3 | 3% |
| 4. Snofil | 5800 @ 3% | 90.1 | 86.9 | 3% |
| 5. Altowhite | — | 91.5 | 89.8 | 5% |
| 6. Cyprus Supreme | — | 90.1 | 86.0 | 5-6% |

[1]Green filter used in Hunter Reflectometer.
[2]Blue filter used in Hunter Reflectometer.

A very satisfactory viscosity range of calcium carbonate containing aqueous suspensions to be utilized in rubber latices is from about 2000 to 4000 cps. The untreated ground marble yields a viscosity of 2000 cps. but, as previously noted, settles very hard. It is important for an additive to retard or prevent this hard settling without causing an unmanageable viscosity increase. The above results indicate that the Tako, Apex and Snobrite clays gave the best overall performances in improving the settling rate (at the lowest concentrations) and preventing hard settling at the lowest suspension viscosities. The results also show that the Tako and Apex clays perform exceptionally well at the 2 percent additive level, by improving the settling rate and preventing hard settling, with retention of a good suspension viscosity. Although it had a greater color effect, the Tako clay gave the best overall performance.

The grinding of the calcium carbonate material in accordance with the present invention can be performed in the presence of a standard dust collection system. Such a system removes the fines and leads to some reduction in suspension viscosity and increase in the settling rate. This system can thus prove beneficial when used in conjunction with the kaolin treatment of the present invention.

Whereas the present invention has been described with respect to specific embodiments thereof, it should be understood that the invention is not limited thereto, as many modifications thereof may be made. It is, therefore, contemplated to cover by the present application any and all such modifications as fall within the true spirit and scope of the appended claims.

I claim:

1. A calcium carbonate composition consisting essentially of calcium carbonate and from about 0.1 to 5% by weight, based on the weight of the calcium carbonate, of kaolin clay.

2. The composition of claim 1 wherein the calcium carbonate is a member selected from the group consisting of natural and synthetic calcium carbonate.

3. The composition of claim 1 wherein the source of the calcium carbonate is a member selected from the group consisting of chalk, marble, and common limestone.

4. The composition of claim 1 wherein the kaolin clay has an acidic pH.

5. The composition of claim 4 wherein the pH of the kaolin clay is 6.5 or less.

6. The composition of claim 4 wherein the pH of the kaolin clay is within the range from about 4 to 6.5.

7. The composition of claim 4 wherein 70% or more of the kaolin clay particles are smaller than 10 microns.

8. The composition of claim 7 wherein the pH of the kaolin clay is within the range from about 4 to 6.5.

9. The composition of claim 1 wherein the kaolin clay comprises from about 1 to 3% by weight, based on the weight of the calcium carbonate.

10. The composition of claim 1 wherein the kaolin clay comprises about 2% by weight, based on the weight of the calcium carbonate.

11. The composition of claim 1 wherein the kaolin clay has an acidic pH.

12. The composition of claim 11 wherein the pH of the kaolin clay is 6.5 or less.

13. The composition of claim 11 wherein 70% or more of the kaolin clay particles are smaller than 10 microns.

14. The composition of claim 13 wherein the source of the calcium carbonate is a member selected from the group consisting of marble and common limestone.

15. The composition of claim 14 wherein the kaolin clay comprises from about 1 to 3% by weight, based on the weight of the calcium carbonate.

16. The composition of claim 15 wherein the pH of the kaolin clay is within the range from about 4 to 6.5.

17. The composition of claim 16 wherein the source of the calcium carbonate is marble.

18. The composition of claim 17 wherein the kaolin clay comprises about 2% by weight, based on the weight of the calcium carbonate.

19. The composition of claim 16 wherein the source of the calcium carbonate is common limestone.

20. The composition of claim 19 wherein the kaolin clay comprises about 2% by weight based on the weight of the calcium carbonate.

21. An aqueous suspension of dispersed calcium carbonate which contains from about 0.1 to 5% by weight, based on the weight of the calcium carbonate, of kaolin clay.

22. The aqueous suspension of claim 21 wherein the concentration of calcium carbonate is between about 20 and 80% by weight of the suspension.

23. The aqueous suspension of claim 21 wherein the calcium carbonate is in a finely divided state and is a member selected from the group consisting of natural and synthetic calcium carbonate.

24. The aqueous suspension of claim 21 wherein the calcium carbonate is in a finely divided state and the source of the calcium carbonate is a member selected from the group consisting of marble and common limestone.

25. The aqueous suspension of claim 24 wherein the kaolin clay has an acidic pH and 70% or more of the kaolin clay particles are smaller than 10 microns.

26. The aqueous suspension of claim 25 wherein the concentration of calcium carbonate is between about 20 and 80% by weight of the suspension.

27. The aqueous suspension of claim 26 wherein the concentration of kaolin clay is from about 1 to 3% by weight of the calcium carbon.

28. The aqueous suspension of claim 27 wherein the concentration of kaolin clay is about 2% by weight of the calcium carbonate.

29. In a rubber latex wherein calcium carbonate is the extender and/or color pigment, the improvement consisting essentially of the addition of from about 0.1 to 5% by weight, based on the weight of the calcium carbonate, of kaolin clay.

30. The rubber latex of claim 29 wherein the calcium carbonate is a member selected from the group consisting of natural and synthetic calcium carbonate.

31. The rubber latex of claim 29 wherein the source of the calcium carbonate is a member selected from the group consisting of marble and common limestone.

32. The rubber latex of claim 31 wherein the kaolin clay has an acidic pH and 70% or more of the kaolin clay particles are smaller than 10 microns.

33. The rubber latex of claim 32 wherein the kaolin clay comprises from about 1 to 3% by weight, based on the weight of the calcium carbonate.

34. The rubber latex of claim 33 wherein the kaolin clay comprises about 2% by weight, based on the weight of the calcium carbonate.

35. A process of treating calcium carbonate to improve the dispersibility of the calcium carbonate in aqueous and organic media which consists essentially of mixing with calcium carbonate from about 0.1 to 5% by weight, based on the weight of the calcium carbonate, of kaolin clay.

36. The process of claim 35 wherein the kaolin clay comprises from about 1 to 3% by weight, based on the weight of the calcium carbonate.

37. The process of claim 35 wherein the kaolin clay has an acidic pH.

38. The process of claim 37 wherein 70% or more of the kaolin clay particles are smaller than 10 microns.

* * * * *